United States Patent [19]

Tomizawa et al.

[11] Patent Number: 4,704,714
[45] Date of Patent: Nov. 3, 1987

[54] METHOD OF DETECTING RECOVERY FROM FAULT IN A DATA TRANSMISSION SYSTEM WHICH EFFECTS LOOPBACK CONTROL

[75] Inventors: Hiroshi Tomizawa, Hitachi; Masakazu Okada, Katsuta; Seiichi Yasumoto, Hitachi; Sadao Mizokawa, Katsuta; Hitoshi Fushimi, Hitachi; Ken Onuki, Hitachi; Masahiro Takahashi, Hitachi; Takuji Hamada, Hitachi, all of Japan

[73] Assignee: Hitachi, Ltd., Tokyo, Japan

[21] Appl. No.: 677,242

[22] Filed: Dec. 3, 1984

[30] Foreign Application Priority Data

Dec. 5, 1983 [JP] Japan ............... 58-228437

[51] Int. Cl.$^4$ .................. H04J 3/14; H04Q 9/00
[52] U.S. Cl. ............................ 370/15; 370/16
[58] Field of Search ............ 340/825.05; 375/10; 370/14, 15, 16, 88; 371/11, 22

[56] References Cited

U.S. PATENT DOCUMENTS

| | | | |
|---|---|---|---|
| 3,652,798 | 3/1972 | McNeilly et al. | 370/16 |
| 3,859,468 | 1/1975 | Smith et al. | 370/88 |
| 3,876,983 | 4/1975 | Zafiropulo et al. | 371/11 |
| 4,530,085 | 7/1985 | Hamada et al. | 370/16 |
| 4,538,264 | 8/1985 | Bahr et al. | 371/11 |
| 4,542,496 | 9/1985 | Takeyama et al. | 340/825.05 |

FOREIGN PATENT DOCUMENTS 54-40003  3/1979  Japan ...................... 371/11

Primary Examiner—Robert L. Griffin
Assistant Examiner—Stephen Chin
Attorney, Agent, or Firm—Antonelli, Terry & Wands

[57] ABSTRACT

A looped data transmission system has a pair of looped transmission lines forming two transmission systems having different transmission directions, and a plurality of stations including at least one control station connected to said transmission lines of the two transmission systems. If a fault occurs in the two transmission lines of the two transmission systems in the same section, a loopback configuration is established such that stations adjacent to the faulty section send signals from one system back to the other system. With the loopback configuration being established, the stations which have received supervisory signals sent from a loopback end station send them back to the transmission line of the other system. When one of the loopback end stations has received a supervisory signal from the direction of the faulty section, it is judged that a portion of the faulty section is recovered, and the result of the judgement is communicated to the control station.

2 Claims, 11 Drawing Figures

36, B SYSTEM TRANSMISSION LINE
37, A SYSTEM TRANSMISSION LINE

FIG. 7(A)

| NO | PRESENT MPX SEL STATE ||||| EVENT |||| NEXT MPX SEL STATE ||||
|---|---|---|---|---|---|---|---|---|---|---|---|---|---|
|  | S0 | S1 | S2 | S3 | S4 | IDUM DET | EDUM DET | ISYNC | ESYNC | S1 | S2 | S3 | S4 |
| 1 | ✕ | 0 | 0 | 1 | 0 | 1 | ✕ | ✕ | 0 | 0 | 0 | 0 | 0 |
| 2 | 0 | 0 | 0 | 0 | 0 | ✕ | ✕ | ✕ | 1 | 0 | 0 | 1 | 0 |
| 3 | 1 | 0 | 0 | 0 | 0 | ✕ | ✕ | ✕ | 1 | 1 | 0 | 0 | 0 |

| NO | TMPX SEL INPUT |||| TMPX OUTPUT ||
|---|---|---|---|---|---|---|
|  | S1 | S2 | S3 | S4 | TMPXA | TMPXB |
| 1 | 0 | 0 | 0 | 0 | 10b | 11b |
| 2 | 0 | 0 | 1 | 0 | 10b | 11c |
| 3 | 1 | 0 | 0 | 0 | 10a | 11b |

FIG. 7(C)

| NO | MPX SEL INPUT | RMPX, SVSMPX, SYNCMPX OUTPUT |||||
|---|---|---|---|---|---|---|
|  | S0 | RMPX | SVSMPX 12c | SVSMPX 12d | SYNCMPX 60c | SYNCMPX 60d |
| 1 | 0 | 14a | 12a | 12b | 60a | 60b |
| 2 | 1 | 14b | 12b | 12a | 60b | 60a |

(a) SERCH COMMAND (b) RECOVERY ANSWER (c) SUPER VISORY SIGNAL

NUMBER OF BIT SIGNAL ⌈1⌋>13

METHOD OF DETECTING RECOVERY FROM FAULT IN A DATA TRANSMISSION SYSTEM WHICH EFFECTS LOOPBACK CONTROL

BACKGROUND OF THE INVENTION

1. Field of the Invention

The present invention relates to a method of detecting recovery from fault in a data transmission system which effects loopback control, and particularly to a method of detecting recovery from a fault in a looped data transmission system which is equipped with looped transmission lines of two systems having different transmission directions, a plurality of stations and at least one control station connected to the transmission lines of these two systems, and which establishes the loopback configuration when the transmission lines of the two systems become defective over the same section, so that stations adjacent to the faulty section send signals from one system back to the other system.

2. Description of the Prior Art

In case transmission lines of two systems become faulty, the signals are sent back to the control station by two stations that are adjacent to the faulty section to perform a so-called loopback control, in order to continue the operation by cutting off the faulty section, as has been disclosed, for example, in Japanese Patent Application Laid-Open No. 79552/1981.

When the fault in the loop transmission lines is recovered by maintenance and checking, on the other hand, it is essential for the transmission system to recognize the recovery as quickly as possible to reconfigure the network.

A method of detecting the recovery of a fault that is suited to such a situation has been taught, for example, in Japanese Patent Application Laid-Open No. 50639/1984. According to this method of detecting the recovery of a fault, the two stations (hereinafter referred to as loopback end stations) adjacent to the faulty section send supervisory signals to each other via the faulty section, and supervise the supervisory signals sent via the faulty section. When at least one of the stations has received a supervisory signal, it is judged that the section of the system of the receiving side has recovered from the fault.

With this method of detecting the recovery of fault, the recovery of fault can be detected without inconvenience when the fault occurs at one place only. When the fault occurs at a plurality of places, however, this method is not capable of detecting the recovery of the fault until the faulty portions are all recovered.

That is, even when the faulty sections are partially recovered, a supervisory signal sent for one loopback end station does not reach another loopback end station since it is interrupted by a faulty section that has not been recovered.

By employing such a method of detecting the recovery of a fault, the stations which are once separated from the transmission system are not allowed to participate in the data transmission, since they are maintained separated from the transmission system until the faulty sections are all recovered.

SUMMARY OF THE INVENTION

The object of the present invention is to provide a method of detecting recovery from a fault in a looped data transmission system wherein, when a fault occurs at a plurality of places in the loop transmission lines or at a plurality of stations connected to the loop transmission lines so that the loopback configuration is established, and when a fault at one place is recovered, at least one loopback end station detects the recovery and reports the result of detection to the control station.

The feature of the invention resides in that, when a fault occurs at a plurality of places in the loop transmission lines or at a plurality of stations connected to the loop transmission lines so that the loopback configuration is established, a station which has received a supervisory signal sent from a loopback end station sends it back to the transmission line of another system, and it is so judged that a portion of the faulty sections is recovered when one of the loopback end stations has received a supervisory signal, and the result is reported to the control station.

Other objects and features of the present invention will become obvious from the embodiment described below in detail.

BRIEF DESCRIPTION OF THE DRAWINGS

FIGS. 7(A) to 7(C) are diagrams showing examples of network configuration control employed in the present invention;

DESCRIPTION OF THE PREFERRED EMBODIMENT

Figure 1:
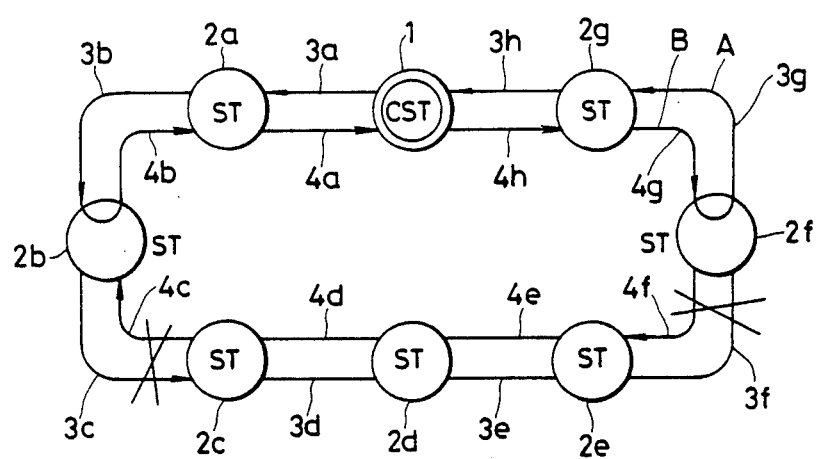
FIG. 1 is a diagram showing a data transmission system which effects the loopback control to which the present invention is adapted.

In FIG. 1, a control station CST 1 sends clock signals to the loop transmission systems, supervises any fault that may occur in the systems, and controls the recovery from a fault.

Stations ST 2a to 2g have terminals (not shown) that are connected to the loop transmission systems. Transmission lines 3a to 3h and 4a to 4h connecting the control station 1 and the stations 2a to 2g, form the loops, respectively, to transmit signals in opposite directions relative to each other.

In case a fault occurs in the transmission lines 3c, 4c and 3f, 4f, the stations 2b and 2f work as loopback end stations, whereby the stations 2a, 2b, 2f and 2g form a closed loop via the control station 1, and the stations 2c, 2d, and 2e are separated from the loop.

The loopback end stations 2b, 2f send supervisory signals to the transmission lines 3c, 4f.

Figure 2:
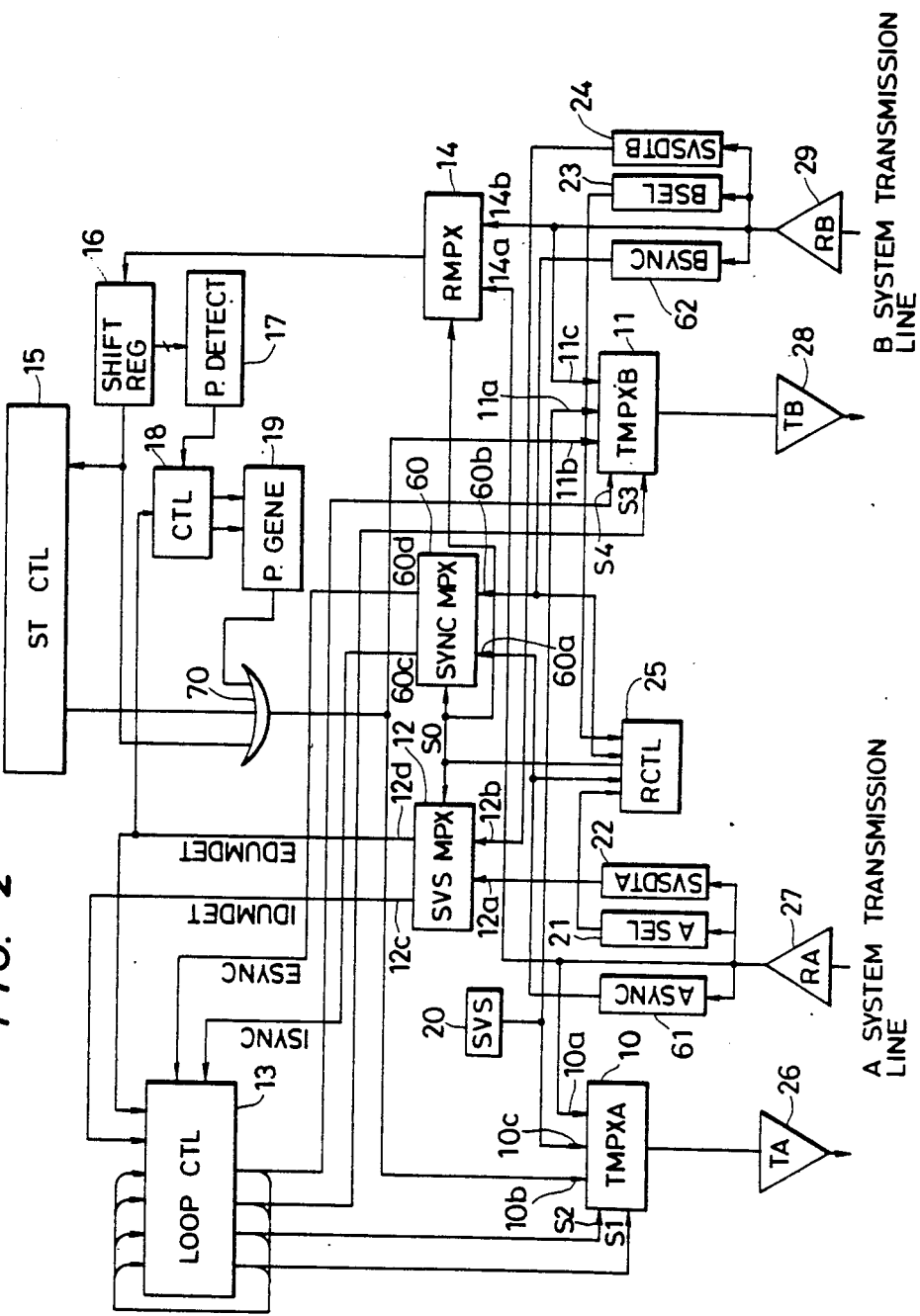
FIG. 2 is a block diagram of an embodiment of a station employed in the present invention.

FIG. 2 is a block diagram of an embodiment of a station employed in the present invention. Here, for easy comprehension, the two transmission lines of opposite directions are referred to as an A-system transmission line and a B-system transmission line.

The data from the A-system transmission line is input to a multiplexer RMPX 14 via a receiving/demodulating circuit RA 27, and the data from the B-system transmission line is input to the multiplexer RMPX 14 via a receiving/demodulating circuit RB 29. The multiplexer 14 works as a selection circuit which determines whether the data of the transmission line of the A-system or the B-system is to be used as the data for a control portion 15 in the station. In this station, the data of either one of the A-system or the B-system is input to the control portion 15. The selection is determined by detector circuits ASEL 21, BSEL 23 that detect transmission line select signals sent through the A-system or the B-system, by circuits ASYNC 61, BSYNC 62 that detect the presence or absence of signals in the A-system and B-system transmission lines, and by a circuit RCTL 25 which determines the selector responsive thereto. That is the selection is so determined that the control portion 15 of the station takes the A-system when an ASEL signal is sent through the A-system, takes the B-system when a BSEL signal is sent through the B-system, takes the A-system when a signal is detected in the A-system, or takes the B-system when a signal is detected in the B-system. The data from the multiplexer 14 is received by the station control portion 15 via a shift register 16. At the same time, a pattern necessary for controlling the station is detected by a pattern detector 17. The data transmitted from the station control portion 15, the data input to the station, and a pattern data newly generated by a pattern that is detected by the pattern detector 17, are input to the multiplexers 10, 11 via an OR gate 70. The output of the pattern detector 17 is input to a control circuit CTL 18, and is used as a signal for controlling a pattern generator 19.

The multiplexers TMPXA 10 and TMPXB 11 are circuits that select one of the three of the aforementioned three kinds of data, received data of the A-system or the B-system, and a supervisory signal produced by a supervisory signal generator (SVS) 20. This is selected by a network configuration controller CTL 13 relying upon signals that are obtained by passing through a multiplexer SVSMPX 12 the detection signals sent from a supervisory signal detector SVSDTA 22 that detects received data of the A-system and from a supervisory signal detector SVSDTB 24 that detects received data of the B-system, relying upon signals obtained by passing through a multiplexer 60 the detection signals sent from the signal detector ASYNC 61 that detects the received data of the A-system and from the signal detector BSYNC 62 that detects the received data of the B-system, and relying upon select signals S1, S2, S3 and S4 that are selecting the multiplexers TMPXA 10 and TMPXB 11. Outputs of the multiplexers 10, 11 are sent to the A-system transmission line and to the B-system transmission line via modulating/transmitting circuits 26, 28.

Figure 3:
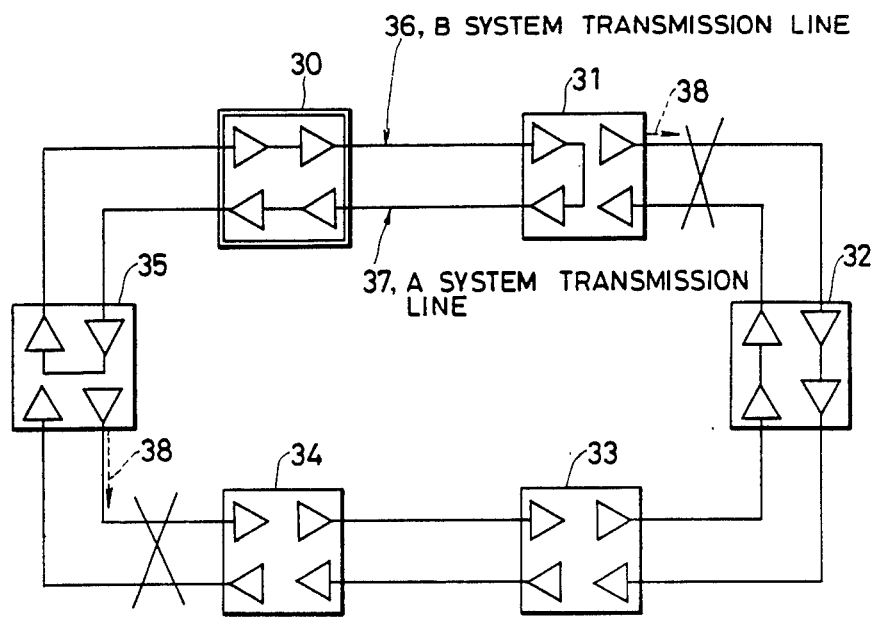
FIGS. 3 to 6 are diagrams showing the loop transmission conditions until the recovery of fault in the loop is detected by the control station.

FIGS. 3 to 6 are diagrams showing transient conditions of a mechanism for recovering and expanding the loopback. Namely, FIG. 3 shows the configuration where the loopback operation is carried out with a control station 30 as a center, and with stations 35 and 31 as end stations. Here, the fault occurs in the transmission lines between the station 34 and the station 35, and in the transmission lines between the station 31 and the station 32.

The stations 35 and 31 send back the data sent from the upstream side of the loops, and send supervisory signals 38 to the downstream side (loopback). However, since the transmission lines are broken at portions marked with X in FIG. 3, the supervisory signals from the stations 35 and 31 are not transmitted to the other stations 34, 33 and 32.

Figure 4:
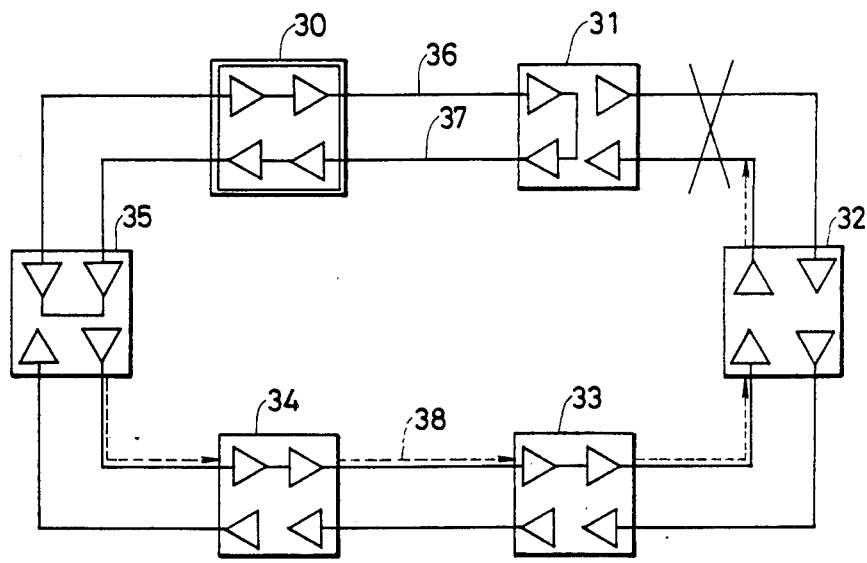
Figure 5:
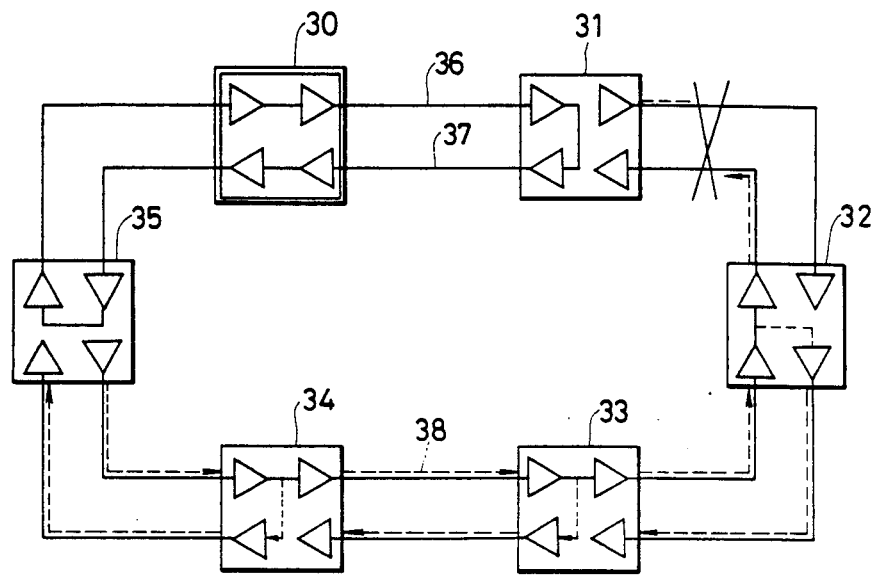

When the fault is recovered between the station 35 and the station 34 as shown in FIG. 4, the stations 34, 33 and 32 are allowed to receive the supervisory signal sent from the station 35. The stations which have detected the supervisory signal sent from one side only, send the supervisory signal to the downstream side and, at the same time, sends the supervisory signal back to the station of the upstream side of the other transmission line, as shown in FIG. 5.

Figure 6:
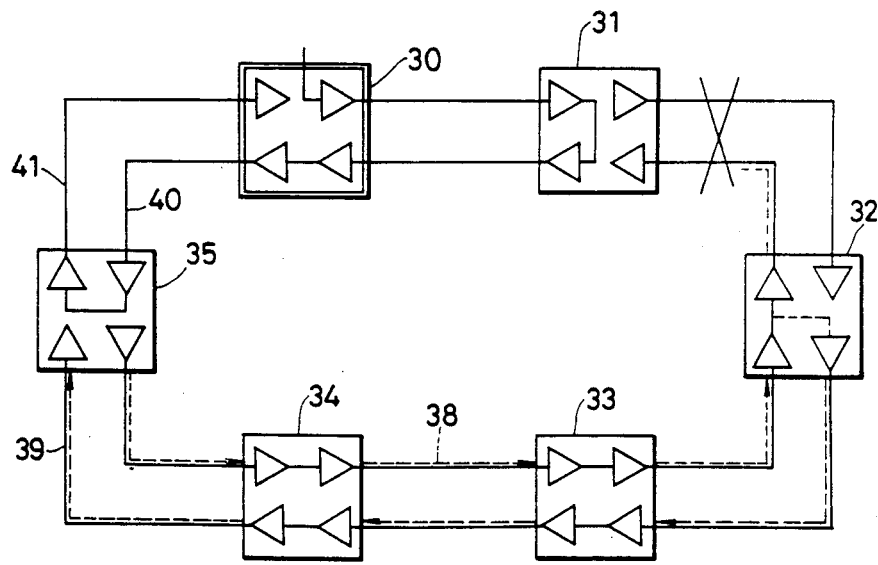

Then, as shown in FIG. 6, the stations 34, 33 detect supervisory signals sent from the upstream side and, hence, cease to send back the supervisory signals but work to pass the supervisory signals directly to the B-system. The station 32, on the other hand, receives no supervisory signal from the station 31 and works to send back the supervisory signals sent from the station 33. Under this condition, the station 35 detects on the side of transmission line 40 a search command signal of whether the recovery is possible or not, that is regularly produced by the control station 30, and further detects the supervisory signal on the side of the transmission line 39. Therefore, the station 35 sends a "recovery answer" to the side of tranmission line 41 to indicate that at least one station is recovered among the stations subsequent to the station 34. Upon receipt of this signal, the control station 30 recognizes that the loop can be recovered, and whereby the loopback operation is stopped, and a new network is configurated.

Means for realizing the mechanism of FIGS. 3 to 6 will be described below in detail in conjunction with the block diagram of FIG. 2 and FIGS. 7(A) to 7(C). In FIG. 3, the stations 31 and 35 are configurated as shown so as to serve as loopback end stations. In this case, the stations 32, 33 and 34 transmit the A-system received data to the A-system transmission line and transmit the B-system received data to the B-system transmission line. This configuration represents the condition of FIG. 2 in which the multiplexer 10 is selecting the data 10b and the multiplexer 11 is selecting the data 11c. This corresponds to the condition of No. 2 in FIG. 7(B). That is, the selector signals S1, S2, S3 and S4 input to the multiplexers 10, 11 are given by (0010). Under this condition, when the faulty portion is recovered between the station 35 and the station 34 in FIG. 3, the station 34 receives a supervisory signal from the A-system transmission line. In this case, transmission line. In this case, transmission of signals has been interrupted in the B-system transmission line. That is, in FIG. 2, the multiplexer 12 selects a supervisory signal 12a sent from the A-system and inputs it to INDUMDET 12c. Further, a signal 60a which indicates that a signal exists in the A-system is selected by the multiplexer 60 and is input to the side of 60c. This represents the condition No. 1 in FIG. 7(C). In this case, the network configurating CTL 13 forms the next network configuration under the condition that the present selector signals S1, S2, S3, S4 (0010) and the B-system side are interrupted, i.e., ESYNC is 0 and IDUMDET 12c is 1. This represents the condition where the selector signals S1, S2, S3 and S4 are given by (0000). The truth values are shown in No. 1 of FIG. 7(A). Due to the selector signals, the multiplexer 10 in FIG. 2 selects the data 10b, and the multiplexer 11 selects the data 11b. The selector condition of this time is shown in No. 1 of FIG. 9(B). That is, the supervisory signal from the A-system is directly sent to the A-system, and is further sent back to the B-system (station 34 of FIG. 5). The above operation is also performed by the stations 33 and 32 as shown in FIG. 5.

Next, the stations 34 and 33 are receiving the supervisory signals from the B-system. Here, since the signal 12b of multiplexer 12 has been input to EDUMDET 12d and a signal 60b of multiplexer 60 has been input to ESYNC 60d in FIG. 2, the network configurating CTL 13 forms the next network configuration under the condition that the present selector signals S1, S2, S3 and S4 are given by (0000) and ESYNC 60d is 1. As shown in No. 2 of FIG. 7(A), the selector signals S1, S2, S3 and S4 are given by (0010). This corresponds to the condition where the multiplexer 10 selects the data 10b and the multiplexer 11 selects the data 11c in FIG. 2. This condition is diagramed in FIG. 6.

Described below is the case when a faulty portion is recovered between the station 31 and the station 32 in FIG. 3. At this moment, the station 32 receives the supervisory signal from the B-system. Therefore, a signal exists in the B-system and no signal exists in the A-system, and whereby the circuit RCTL 25 of FIG. 2 produces an output SO of 1 to select the selector as shown in No. 2 of FIG. 7(C). The subsequent procedure is the same as the one described above. However, the network configurating CTL 13 produces a logic output as shown in No.3 of FIG. 7(A), and the selection of selector by the multiplexers 10, 11 is as shown in No. 3 of FIG. 7(B).

Figure 8:
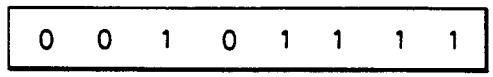
FIG. 8 is a diagram showing examples of special pattern formats employed in the present invention.
Figure 8:
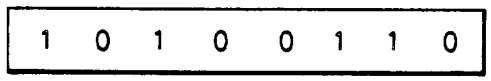
Figure 8:
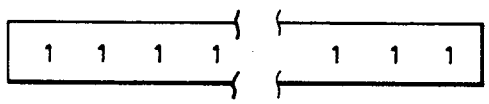
Figure 9:
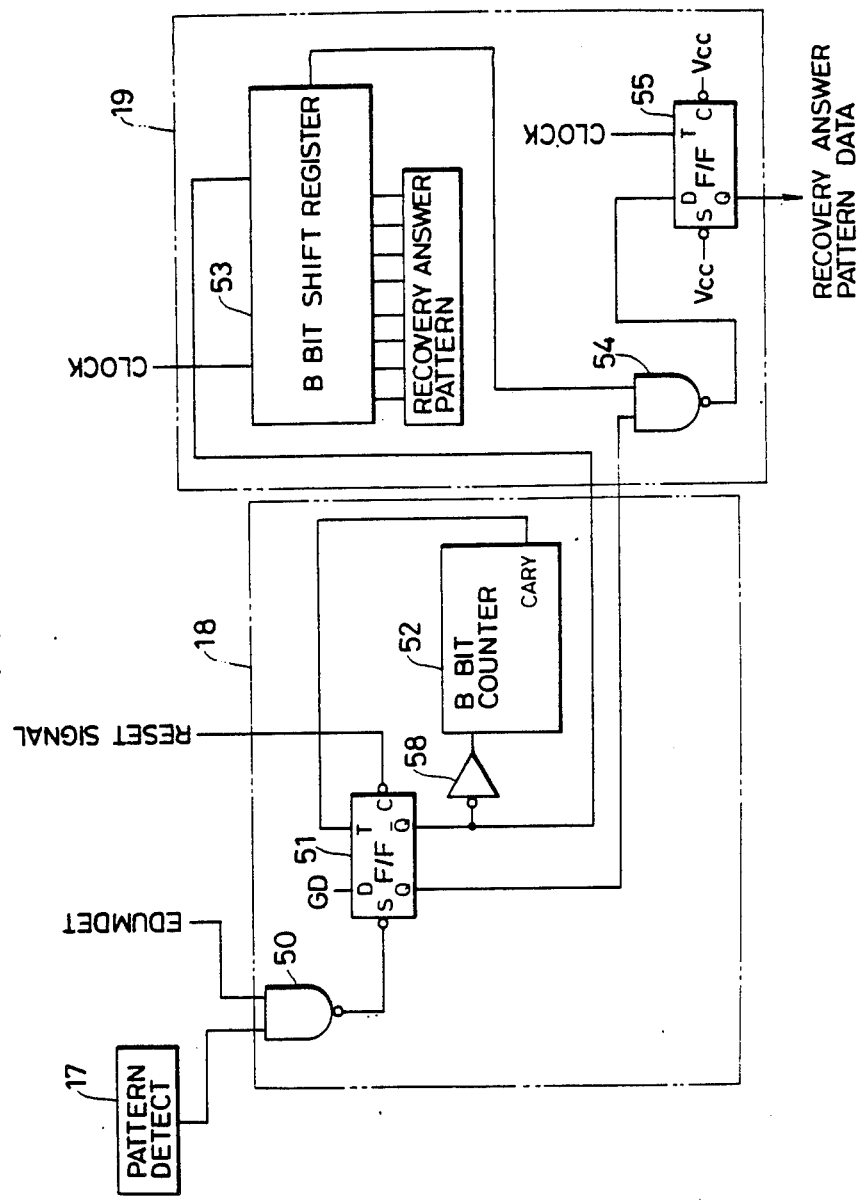
FIG. 9 is a circuit diagram which concretely illustrates a portion of FIG. 2.

FIGS. 8(a) to 8(c) illustrate special signal patterns employed for recovery answer in the present invention, i.e., illustrate patterns of "search command", "recovery answer", and "supervisory signal". FIG. 9 shows a circuit which produces the "recovery answer" upon receipt of the "search command". That is, FIG. 9 shows in detail the circuit CTL 18 of FIG. 2.

In FIG. 9, there is established a logic condition AND 50 under the condition where a "search command" signal is detected from the transmission system and a "supervisory" signal is detected from another system. Under this condition, a flip-flop (F/F) 51 is set, and an 8-bit counter 52 starts to count eight clocks. While the clocks are being counted, an 8-bit shift register 53 shifts out a pattern of "recovery answer". As the eight clocks are counted, the carry of counter 52 rises to clear the F/F 51 and to stop the shift out from the shift register 53. In FIG. 9, the pattern generator 19 of FIG. 2 is closely represented by the 8-bit shift register 53, a gate 54 which permits the passage of output data from the shift register while eight bits are being counted, and an F/F 55 which sends the shift data in synchronism with the transmitting clock signals.

According to this embodiment, the stations that had been separated due to a fault are allowed to send supervisory signals from one transmission line back to another transmission line. Therefore, the loopback of a portion can be easily expanded.

The present invention makes it possible to detect the recovery of a faulty portion among a plurality of faulty portions in the loop transmission lines and, hence, enables a transmission control apparatus that can be inserted in the loop transmission system to be readily incorporated in the transmission system.

What is claimed is:

1. A method of detecting recovery of a fault in a looped data transmission system comprising two looped transmission lines, the transmission directions of which are opposite relative to each other, and a plurality of stations including at least one control station connected to said transmission lines in such a way that said two looped transmission lines are divided into a plurality of sections by said stations, said method comprising the steps of establishing a loopback configuration between the two transmission lines in a pair of stations such that stations adjacent to a faulty section send signals from one transmission line to the other transmission line in case a fault occurs in the adjacent section; sending supervisory signals from each of the stations adjacent to a faulty section toward the other station via the adjacent faulty section on a respective one of said transmission lines; in case that faults occur in two sections which are not adjacent to each other, controlling the stations positioned between said two faulty sections to effect loopback of any supervisory signals received thereby on one transmission line as well as re-transmission of the received supervisory signal on the same one transmission line to the next adjacent station in the direction of transmission on said one transmission line; judging that a faulty section has recovered from the fault when at least one of said stations adjacent to the previously faulty section receives a supervisory signal via the previously faulty section from an adjacent station; sending a search command signal periodically from the control station to the stations adjacent to a faulty section to inquire whether the faulty section has recovered; and sending from the stations adjacent a faulty section that have received a supervisory signal a recover answer signal to the control station in response to the search command signal.

2. A method according to claim 1, further comprising the step of reconfiguring the loopback condition of a station adjacent a previously faulty section when the control station receives said recovery answer signal from that station.

* * * * *